United States Patent [19]

Launay

[11] 4,311,716
[45] Jan. 19, 1982

[54] FOOD PRODUCT MOULDING PROCESS

[75] Inventor: Noël Launay, Beauvais, France

[73] Assignee: Societe d'Assistance Technique pour Produits Nestle S.A., Lausanne, Switzerland

[21] Appl. No.: 239,902

[22] Filed: Mar. 3, 1981

[30] Foreign Application Priority Data

Mar. 12, 1980 [FR] France .................... 80 05534

[51] Int. Cl.³ .................. A23G 9/04; A23G 3/20; A23G 3/28
[52] U.S. Cl. .................. 426/275; 249/82; 249/92; 425/123; 425/125; 426/274; 426/302; 426/512; 426/515; 426/95; 426/94; 426/101; 426/103; 99/450.1
[58] Field of Search .............. 426/95, 94, 101, 100, 426/280, 89, 90, 91, 103, 102, 274, 275, 279, 281–284, 515, 512, 517, 302; 249/82, 83, 92, 91, 96, 136; 425/123, 125, 127; 264/277, 278; 99/450.1, 450.6, 450.7

[56] References Cited

U.S. PATENT DOCUMENTS

| | | | |
|---|---|---|---|
| 1,787,829 | 1/1931 | Lucht | 249/92 |
| 2,248,651 | 7/1941 | von Losberg | 249/92 |
| 2,619,046 | 11/1952 | Henderson | 249/91 |
| 2,681,144 | 6/1954 | Turner | 249/91 |
| 2,734,449 | 2/1956 | Erickson | 249/96 |

*Primary Examiner*—Steven L. Weinstein
*Attorney, Agent, or Firm*—Vogt & O'Donnell

[57] ABSTRACT

A process for moulding a food product consisting of a plastic mass, such as ice cream, and firm elements, such as biscuits. A multiple-cavity mould open downwards is placed on a fixed platform, a base is arranged in the mould on a vertically displaceable support, the biscuits are arranged between the base and the cavities and the mould is fitted with ice cream while the base is lowered.

4 Claims, 2 Drawing Figures

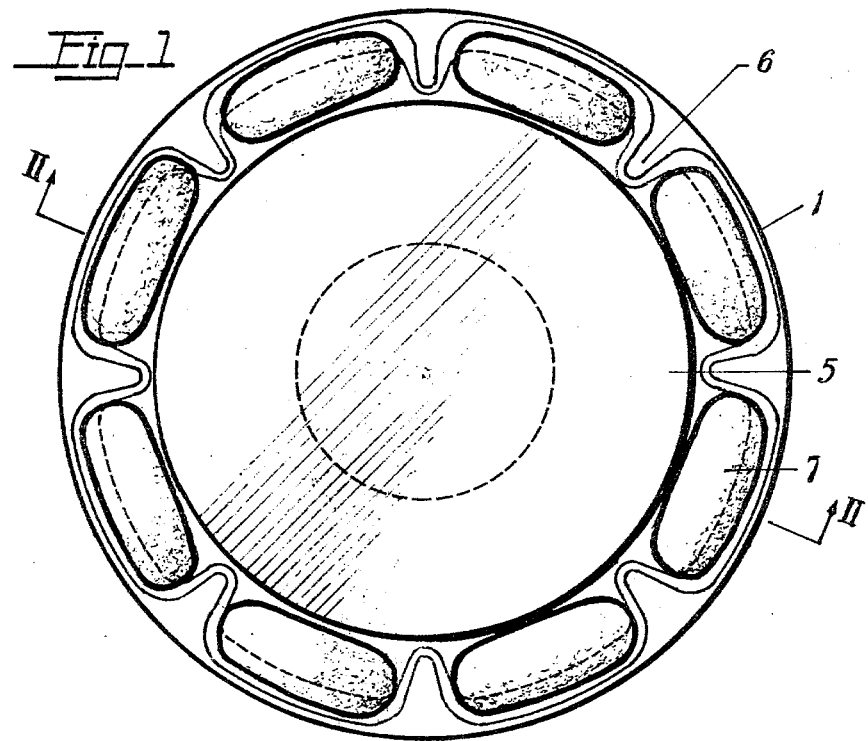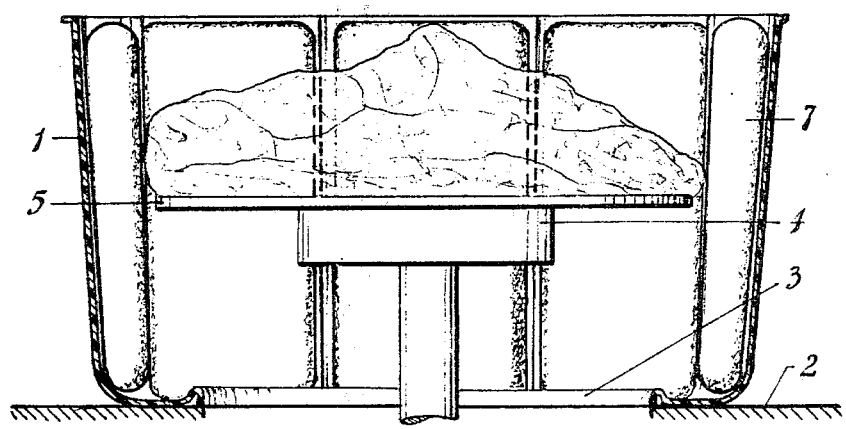

FOOD PRODUCT MOULDING PROCESS

This invention relates to a process for moulding a food product consisting of a plastic mass and firm elements.

According to the invention, a multiple-cavity mould open downwards is disposed on a fixed platform, a base is placed in the mould above the bottom thereof on a vertically displaceable support, the firm elements are arranged between the base and the cavities, the space delimited by the base and said elements is filled with the plastic mass and the base is lowered while filling is continued until it rests on the bottom of the mould.

This process is particularly effective for making ice-cream gateaux surrounded for example by meringues or biscuits.

One embodiment of the process according to the invention is illustrated by way of example in the accompanying drawings, wherein:

FIG. 1 is a plan view of a multiple-cavity mould required for carrying out the process according to the invention with firm elements arranged in the cavities.

FIG. 2 is a section on the line II—II through the mould shown in FIG. 1 with a base arranged on a displaceable support at the beginning of the moulding operation.

The mould shown in FIGS. 1 and 2 of the accompanying drawings is a downwardly open multiple-cavity mould 1 of synthetic material which is arranged on a fixed platform 2. A vertically displaceable support 4 passes through the lower opening 3 of the mould. A base 5, which in the illustrated embodiment is a cardboard disc, is arranged substantially mid-way up the mould, the support 4 being adjusted to the appropriate level. This base has a diameter slightly smaller than the diameter of a circle drawn within the ridges 6 separating the cavities. The firm elements, in the embodiment illustrated meringues 7, are then arranged between the cavities and the base which stops the meringues from falling into the mould. The space delimited by this base and the meringues then begins to be filled with the plastic mass, in the present case ice cream. The meringues are now held in place by the mass. When the space is filled, the base is gradually lowered by lowering the displaceable support while filling is continued until the base comes to rest on the bottom of the mould.

The food product may later be removed from the mould by inverting the mould and pressing on the base 5 with the thumbs through the opening 3 whilst at the same time withdrawing the mould upwards.

This process enables the preparation of composite food products to be mechanised. It is particularly effective in the case of food products consisting of a plastic mass, such as ice cream, sorbet, a mousse, a jelly, etc. garnished on their sides with firm elements, such as biscuits, meringues, wafers, pieces of chocolate, nougat, etc.

I claim:

1. A process for moulding a composite food product consisting of a plastic mass and firm elements arranged around and to the sides of said mass, comprising the steps of disposing a multiple-cavity mould having opposite open ends and open downwards on a fixed platform, placing a base in the mould above the bottom thereof on a vertically displaceable support, arranging said firm elements upright between said base and said cavities, said base being at a height relative to said firm elements sufficient to support and retain the firm elements in their upright position, filling the space delimited by said base and said elements with said plastic mass so that the plastic mass contacts the firm elements and lowering said base and said vertical displaceable support while filling is continued until said base comes to rest on the bottom of said mould thereby forming said composite food product.

2. A moulding process according to claim 1, in which, at the beginning of said process, said base is situated substantially mid-way up the mould.

3. A moulding process according to claim 1, in which said plastic mass is ice cream.

4. A moulding process according to claim 1, in which said firm elements are meringues.

* * * * *